(12) United States Patent  (10) Patent No.: US 6,494,929 B2
Wilkins  (45) Date of Patent: Dec. 17, 2002

(54) CYCLONE FOR SUCTION CLEANER

(75) Inventor: John Thomas Wilkins, Hertfordshire (GB)

(73) Assignee: Stimvak Limited, London (GB)

( * ) Notice: Subject to any disclaimer, the term of this patent is extended or adjusted under 35 U.S.C. 154(b) by 0 days.

(21) Appl. No.: 09/794,730

(22) Filed: Feb. 27, 2001

(65) Prior Publication Data

US 2001/0050001 A1 Dec. 13, 2001

Related U.S. Application Data

(63) Continuation of application No. PCT/GB99/02939, filed on Sep. 6, 1999.

(30) Foreign Application Priority Data

Sep. 4, 1998 (GB) .............................................. 9819373

(51) Int. Cl.⁷ .............................................. B01D 45/12
(52) U.S. Cl. ....................... 55/459.1; 55/459.5; 55/420; 55/DIG. 3; 15/353
(58) Field of Search .............................. 55/459.1, 459.3, 55/459.5, 466, 420, 429, DIG. 3; 15/352, 353

(56) References Cited

U.S. PATENT DOCUMENTS

| 2,180,694 | A |   | 11/1939 | Reed |  |
|---|---|---|---|---|---|
| 2,824,335 | A | * | 2/1958 | Moffat | 15/352 |
| 3,246,454 | A | * | 4/1966 | Norton | 55/459.1 |
| 3,870,486 | A |   | 3/1975 | Eriksson et al. |  |
| 4,001,121 | A |   | 1/1977 | Bielefeldt |  |
| 4,344,783 | A |   | 8/1982 | Heinemann et al. |  |
| 4,566,149 | A | * | 1/1986 | Fitzwater | 15/352 |
| 4,622,132 | A |   | 11/1986 | Chupka |  |
| 5,752,997 | A |   | 5/1998 | Roth |  |
| 6,090,174 | A | * | 7/2000 | Douma et al. | 55/337 |

FOREIGN PATENT DOCUMENTS

| DE | 4441749 A1 | 5/1996 |
|---|---|---|
| EP | 0 039 767 A2 | 11/1981 |
| EP | 0489468 A1 | 6/1992 |
| EP | 0740922 A1 | 11/1996 |
| GB | 2116457 A | 9/1983 |
| JP | 1-305917 | 12/1989 |
| WO | WO 95/10972 | 4/1995 |

* cited by examiner

Primary Examiner—Robert A. Hopkins
(74) Attorney, Agent, or Firm—Schwegman, Lundberg, Woessner & Kluth, P.A.

(57) ABSTRACT

A cyclone is provided above a liquid receptacle (4) in a housing (1,3) whose interior is at reduced pressure in operation. Liquid and solid particles carried by the incoming stream of air accumulate in the cyclone (18) and circulate as a body of solid-laden liquid while coming repeatedly into contact with the incoming stream. Excess solid-laden liquid flows down into the receptacle (4) from the cyclone (18) through a lower outlet (23a). The air leaves the cyclone substantially freed from liquid droplets and solid particles.

19 Claims, 4 Drawing Sheets

CYCLONE FOR SUCTION CLEANER

CROSS-REFERENCE TO RELATED APPLICATIONS

This application is a continuation of PCT/GB99/02939, filed on Sep. 6, 1999, which in turn is an international filing of Great Britain Application Number 9819373.3, filed on Sep. 9, 1998. The PCT/GB99/02939 application is herein incorporated by reference.

This invention relates generally to cyclones and particularly but not exclusively to cylones in suction cleaners which draw in air carrying dirt-laden liquid.

Such suction cleaners are described in U.S. Pat. No. 3,262,146 and United Kingdom Patents GB-A-1 448 434, GB-A-1 497 709, and GB-B-2 154 431. In suction cleaners of this type, an upwardly open receptacle for dirt-laden liquid (e.g. water) is provided in a housing whose interior is at a reduced pressure in operation. The volume ratio of air to liquid on entry into the housing may typically be roughly 30 parts of air to one part of liquid. The liquid is therefore in the form of small droplets scattered in the air stream and suspended by the motion and turbulence of the air.

A problem with suction cleaners of this type is that fine droplets remain suspended in the air as it travels through the machine. Although most of them are deposited on surfaces and fall into the collection tank, a significant proportion continues suspended in the air stream and leaves via the suction fan. The soiled liquid droplets then evaporate, leaving a fine dust possibly contaminated with allergens and pathogens suspended in the air. The suspended liquid may eventually damage the mechanism or electrical parts of the suction cleaner. It may also shorten the life of any outlet filters used. There is also the possibility that dirt entrained in the incoming air is not captured by the liquid droplets.

The present invention provides a cyclone in which liquid carried by an incoming stream of air accumulates and circulates while coming repeatedly into contact with the incoming stream.

In particular, the invention provides a cyclone in which solid and liquid particles carried by an incoming stream of air are separated from the air stream, the cyclone having a curvilinear peripheral wall, a top wall extending inwards from the entire periphery of the peripheral wall, and a bottom wall extending substantially horizontally inwards from the entire periphery of the peripheral wall, at least one of the top and bottom walls having an outlet spaced from the peripheral wall, the peripheral wall having an inlet port for the incoming stream of air carrying solid and liquid particles, the inlet port directing the incoming stream substantially tangentially to the peripheral wall so that solid and liquid particles carried by the incoming stream are deposited on the peripheral wall, accumulate on the substantially horizontal bottom wall, and circulate as a body of solid-laden liquid while coming repeatedly into contact with the incoming stream, excess solid-laden liquid escaping through the outlet.

As applied to a suction cleaner, the invention provides a suction cleaner comprising a housing whose interior is at reduced pressure in operation, an upwardly open liquid receptacle in the housing, and a cyclone above the receptacle in the housing, the cyclone having a curvilinear peripheral wall, a top wall extending inwards from the entire periphery of the peripheral wall, and a bottom wall extending substantially horizontally inwards from the entire periphery of the peripheral wall and having an outlet spaced from the peripheral wall and communicating with the receptacle, and the peripheral wall having an inlet port for an incoming stream of air carrying dirt and liquid, the inlet port communicating with the exterior of the housing and directing the incoming stream substantially tangentially to the peripheral wall so that liquid carried by the incoming stream is deposited on the peripheral wall, accumulates on the substantially horizontal bottom wall in the cyclone, and circulates as a body of dirt-laden liquid while coming repeatedly into contact with the incoming stream, excess dirt-laden liquid escaping through the outlet to the receptacle.

Dirt (such as dust, lint, soil, mites, and other debris) carried by the incoming stream of air is captured by the circulating body of dirtladen liquid in the cyclone.

Preferred and optional features are set forth in the claims.

The invention will be described further, by way of example, with reference to the accompanying drawings, in which.

Figure 1:
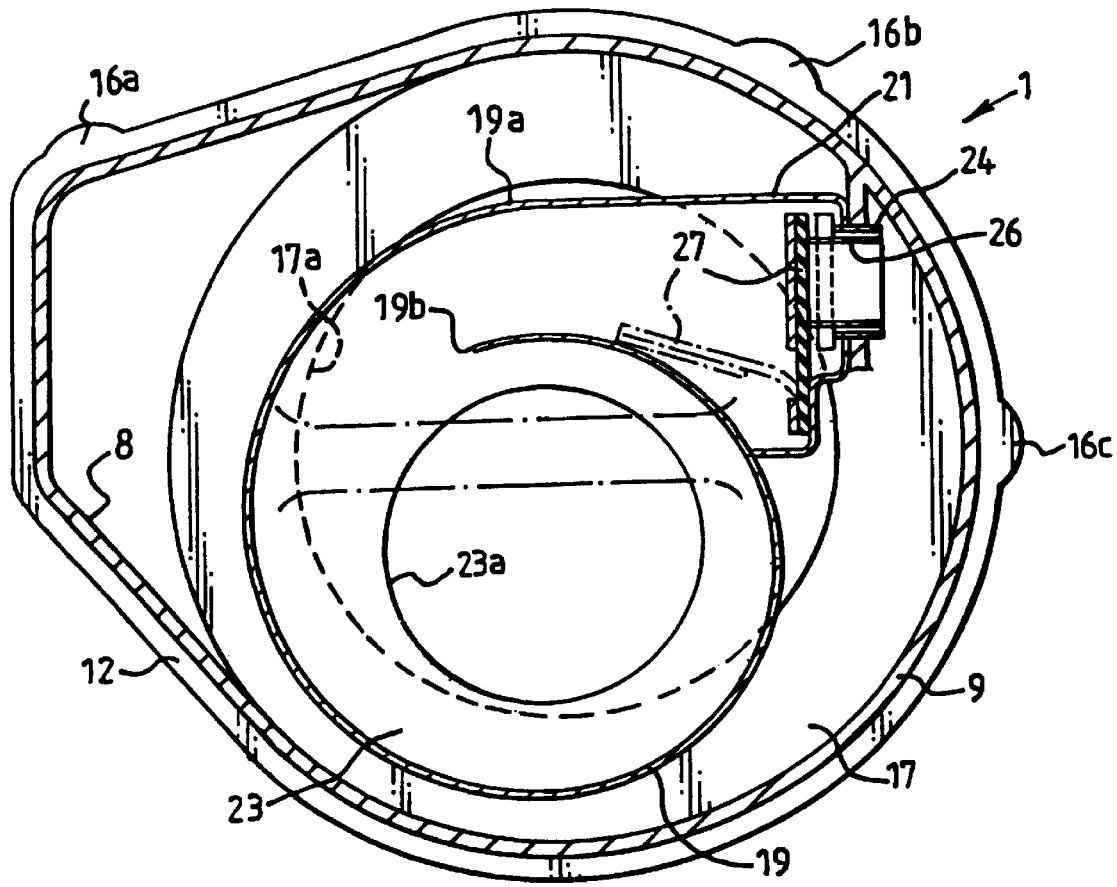
FIG. 1 is a sectioned plan view of a lid portion of a suction cleaner with a cyclone in accordance with the invention.
Figure 2:
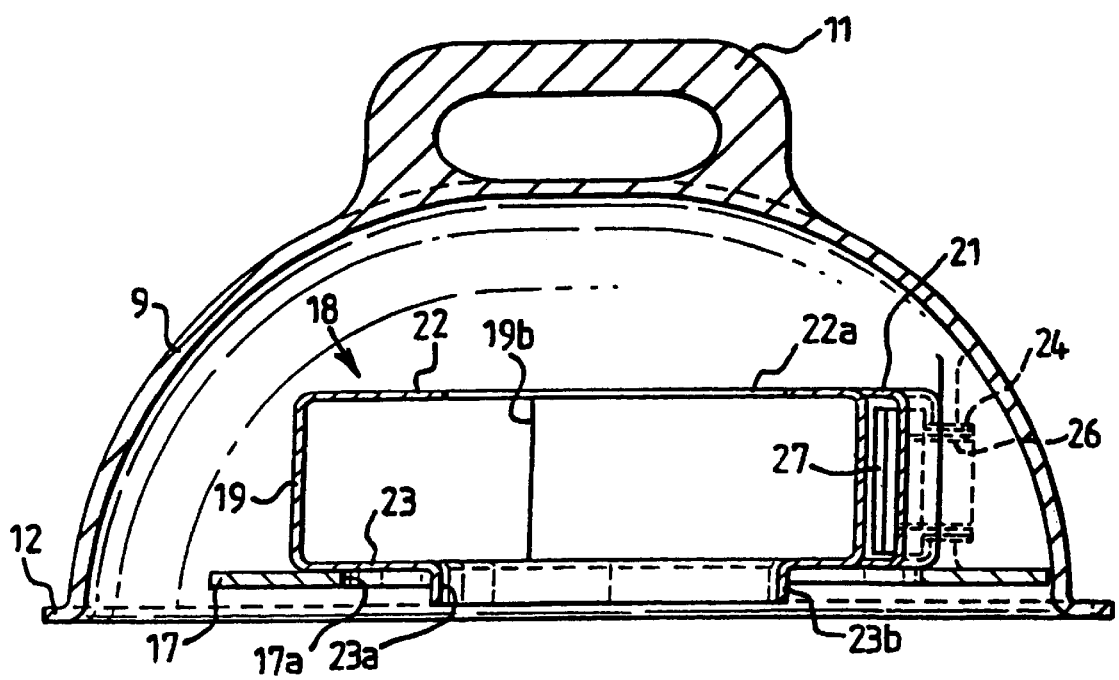
FIG. 2 is a sectioned side view of the lid portion.
Figure 3:
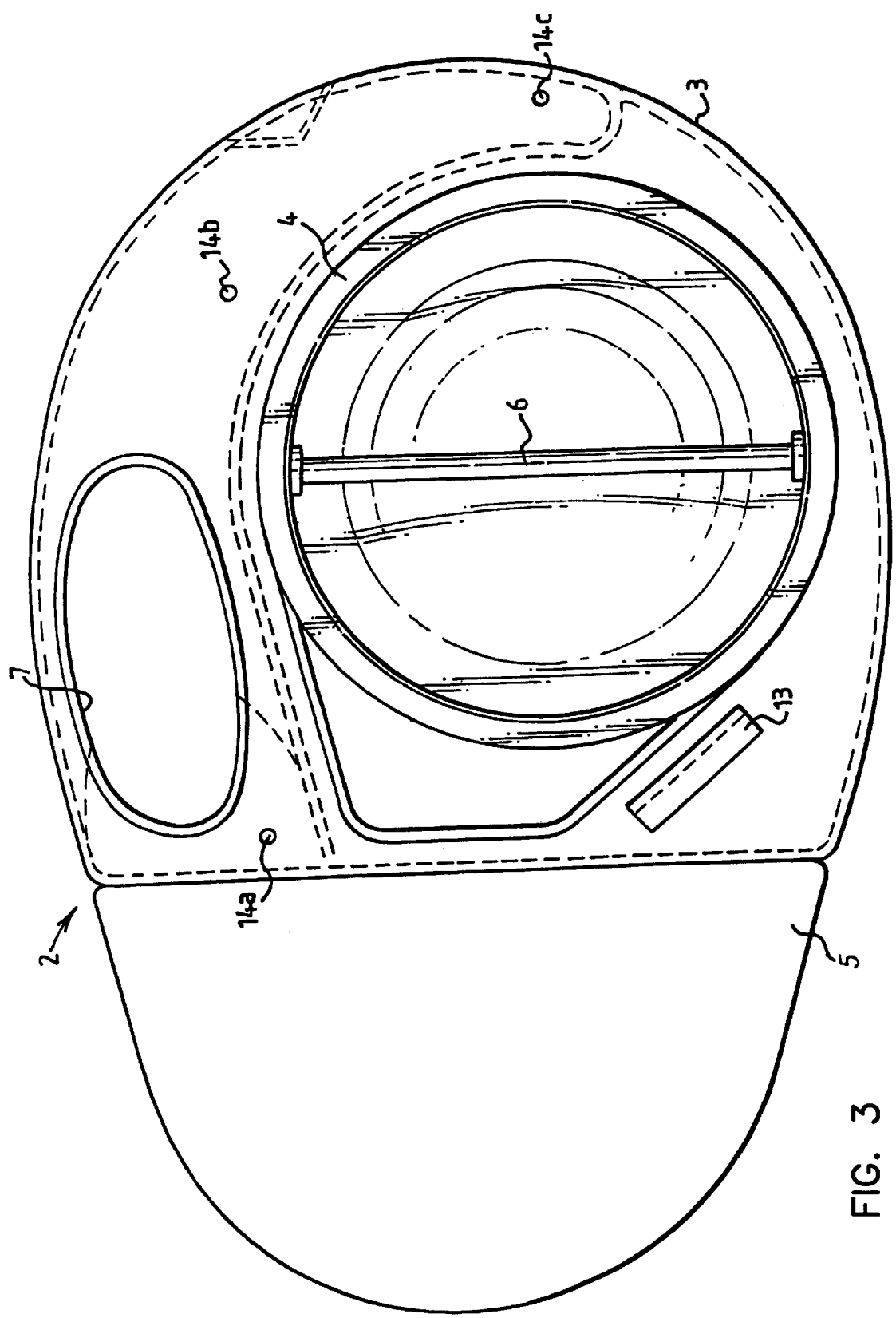
FIG. 3 is a plan view of the main body of the suction cleaner, on which the lid portion is to be fitted.

The suction cleaner which is illustrated comprises a removable lid portion (FIGS. 1 and 2) and a main body 2 which is generally oval in plan view (FIG. 3). The body 2 comprises a housing base 3, which accommodates a removable receptacle or bucket 4 with a handle 6, and an electrical unit 5 which is fixed to the housing base 3 and which accommodates a motor-driven suction fan (not shown) and a clean-water pump (not shown). The pump drives clean water (or other cleaning liquid) from a reservoir 7 in the housing base 3 to one or more spray nozzles associated with a cleaning tool incorporating a suction tube. The reservoir 7 has a smaller volume than the bucket 4. The suction fan inlet communicates with a space 8 in the interior of the housing base 3 but outside the bucket 4. The interior of the lid portion 1 communicates with the space 8, which is at a reduced pressure when the suction fan is in operation.

The lid portion 1 comprises a dome 9 made of clear plastics material, with an integral handle 11. The dome 9 has a rim 12 which engages under a bracket 13 on the housing base 3 and which surrounds the upper end of the space 8 and the bucket 4. Releasable clips (not shown) at locations 14a–c cooperate with fixing points 16a–c on the rim 12. The lid portion 1 has an integral horizontal partition 17 (with a central aperture 17a), which covers the upper end of the bucket 4 and supports a cyclone 18.

The cyclone 18 has an upstanding peripheral wall 19 which is curvilinear, extending as a spiral of decreasing radius over a little more than 360° from an outer position 19a to an inner edge 19b. An inlet section 21 is integrally connected to the peripheral wall 19. The top of the cyclone 18 has a horizontal wall 22 which extends integrally inwards from the peripheral wall 19 and has an optional air outlet aperture 22a. The cyclone 18 also has a bottom wall 23 which extends integrally horizontally inwards from the peripheral wall 19 and defines an outlet 23a with a depending lip 23b.

The inlet section 21 of the cyclone 18 has an inlet fitting 24 for receiving the end of the above-mentioned suction tube of the cleaning tool (not shown). The inlet fitting 24 has an inlet port 26 for the air carrying dirt-laden droplets of water. A non-return flap valve 27 is deflected by the incoming air stream to the position shown in chain line in FIG. 1. The stream of air (with entrained droplets of dirty water and possibly also non-wetted particles of dirt), which enters the cyclone 18 tangentially, is deflected by the curvilinear peripheral wall 19, causing water droplets to be deposited on the peripheral wall. The air stream flows along the curvilinear wall 19 and circulates in the cyclone 18 so that the entrained water separates out centrifugally. Owing to the reduced pressure in the dome 9 and in the housing base 3, the air (substantially freed from water droplets and particulates) leaves the cyclone 18 through the upper aperture 22a and the lower outlet 23a and passes to the space 8 and thence to the suction fan without substantially agitating the contents of the bucket 4.

The dirt-laden water which separates out from the air stream, in the cyclone 18, accumulates in the peripheral channel defined by the peripheral wall 19 and the top and bottom walls 22,23, from where excess dirt-laden liquid flows down into the bucket 4 through the lower outlet 23a. The cyclone thus locally increases the ratio of liquid to air in the incoming stream. This ensures that fine droplets are absorbed into a liquid stream and do not pass through the suction fan. The liquid accumulated in the cyclone is used many times over. This is achieved by the use of a cyclone in the form of a channel which retains the droplets by centrifugal force to form a substantial amount of rotating liquid. The incoming air stream is intimately mixed with the accumulated liquid which is in the form of a curtain as it crosses from the edge 19b back to the wall 19. This effect totally eliminates fine droplets from the air stream, so that there is no carry over to the suction fan and perfect extraction of dust is achieved within the cyclone. The local volume ratio of liquid to air is increased at the crossover point from one part in 30 to near equal volumes.

The peripheral channel will start to fill when the suction cleaner is switched on and at this point the droplets are retained as in a normal cyclone, but extraction of dirt from the air will improve as the channel fills. When it is full, water will leave at the same slow rate at which it enters but in the form of large droplets which fall into the collection bucket 4. Once the cyclone is full the rate at which water is injected into the air intake can be reduced, possibly to zero, whilst retaining perfect extraction of even dry material. This will allow a substantial increase in the running time between cleaning liquid refills.

To maintain the operation of the cyclone 18 if the air inlet is sealed it may be necessary to fit a spring-loaded valve to the inlet fitting which allows air to enter at high vacuum. The non-return valve 27 operates at low vacuum and its purpose is to prevent spillage if the machine is tipped endwise.

Various modifications may be made within the scope of the invention. For instance the cross-sectional shape of the peripheral channel may be varied. The curvature of the spiral wall 19 may be varied and may change gradually or stepwise. The non-return valve 27 may be omitted. The lid portion 1 may be hinged to the housing base 3. The shape of the lid portion 1 may be varied and the handle 11 may be omitted. The bucket 4 could be replaced by a fixed receptacle from which the dirt-laden water could be removed by pumping or by tipping up the body 2.

Figure 4:
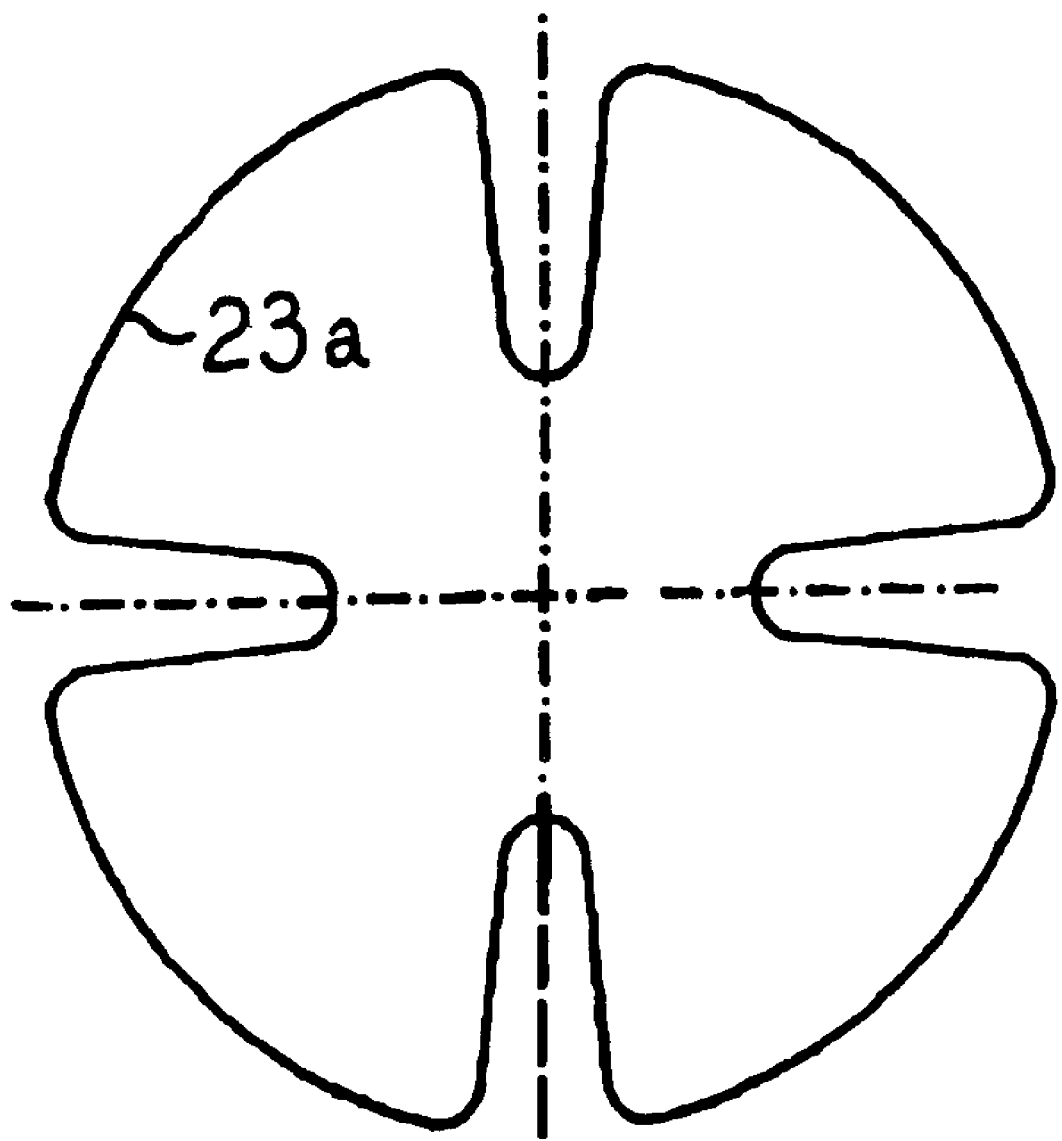
FIG. 4 is a plan view of an outlet in an alternative embodiment of the cyclone.

As shown in FIG. 4, the outlet 23a may be formed with a plurality of inwardly directed projections or vanes 23c (in this example, four equi-spaced vanes) which prevent the swirling exit air from causing the water surface below the cyclone to break into droplets. The radial length of the vanes 23c may vary along the axial direction of the outlet.

Although the cyclone has been described above in relation to its use in a suction cleaner, it will be appreciated that the cyclone can be used in other equipment and installations. For example, it may be used in a process plant where, in a mixing process, an increase in ratio of liquid to solid material is required and the material is carried in an air stream.

What is claimed is:

1. A suction cleaner comprising a housing whose interior is at reduced pressure in operation, an upwardly open liquid receptacle in the housing, and a cyclone above the receptacle in the housing, the cyclone having a curvilinear peripheral wall, a top wall extending inwards from the entire periphery of the peripheral wall, and a bottom wall extending substantially horizontally inwards from the entire periphery of the peripheral wall and having an outlet spaced from the peripheral wall and communicating with the receptacle, and the peripheral wall having an inlet port for an incoming stream of air carrying dirt and liquid, the inlet port communicating with the exterior of the housing, being in the vicinity of the bottom wall and directing the incoming stream substantially tangentially to the peripheral wall so that liquid carried by the incoming stream is deposited on the peripheral wall, accumulates on the substantially horizontal bottom wall in the cyclone, and circulates as a body of dirt-laden liquid while coming repeatedly into contact with the incoming stream, excess dirt-laden liquid escaping through the outlet to the receptacle.

2. A suction cleaner as claimed in claim 1, in which the curvilinear peripheral wall has a curvature which increases in the downstream direction.

3. A suction cleaner as claimed in claim 2, in which the curvilinear wall extends over more than 360°.

4. A suction cleaner as claimed in claim 1, in which an upper air outlet is provided in the top wall.

5. A suction cleaner as claimed in claim 1, in which the inlet port is provided with a non-return inlet valve or flap valve.

6. A suction cleaner as claimed in claim 1, in which the housing comprises a base portion containing the receptacle and a removable lid portion containing the cyclone.

7. A suction cleaner as claimed in claim 6, in which the lid portion includes a horizontal partition which supports the cyclone.

8. A suction cleaner as claimed in claim 1, further comprising a reservoir for a cleaning liquid.

9. A suction cleaner as claimed in claim 8, in which the reservoir has a smaller volume than the receptacle.

10. A cyclone in which solid and liquid particles carried by an incoming stream of air are separated from the air stream, the cyclone having a curvilinear peripheral wall, a top wall extending inwards from the entire periphery of the peripheral wall, and a bottom wall extending substantially horizontally inwards from the entire periphery of the peripheral wall, at least one of the top and bottom walls having an outlet spaced from the peripheral wall, the peripheral wall having an inlet port for the incoming stream of air carrying solid and liquid particles, the inlet port directing the incoming stream substantially tangentially to the peripheral wall so that solid and liquid particles carried by the incoming stream are deposited on the peripheral wall, accumulate on the substantially horizontal bottom wall, and circulate as a body of solid-laden liquid while coming repeatedly into contact with the incoming stream, excess solid-laden liquid escaping through the at least one outlet, and wherein the curvilinear peripheral wall has a curvature which increases in the downstream direction.

11. A suction cleaner comprising a housing whose interior is at reduced pressure in operation, an upwardly open liquid receptacle in the housing, and a cyclone above the receptacle in the housing, the cyclone having a curvilinear peripheral wall, a top wall extending inwards from the entire periphery of the peripheral wall, and a bottom wall extending substantially horizontally inwards from the entire periphery of the peripheral wall and having an outlet spaced from the peripheral wall and communicating with the receptacle, and the peripheral wall having an inlet port for an incoming stream of air carrying dirt and liquid, the inlet port communicating with the exterior of the housing and directing the incoming stream substantially tangentially to the peripheral wall so that liquid carried by the incoming stream is deposited on the peripheral wall, accumulates on the substantially horizontal bottom wall in the cyclone, and circulates as a body of dirt-laden liquid while coming repeatedly into contact with the incoming stream, excess dirt-laden liquid escaping through the outlet to the receptacle, and wherein the curvilinear peripheral wall has a curvature which increases in the downstream direction.

12. A suction cleaner comprising a housing whose interior is at reduced pressure in operation, an upwardly open liquid receptacle in the housing, and a cyclone above the receptacle in the housing, the cyclone having a curvilinear peripheral wall, a top wall extending inwards from the entire periphery of the peripheral wall, and a bottom wall extending substantially horizontally inwards from the entire periphery of the peripheral wall and having an outlet spaced from the peripheral wall and communicating with the receptacle, and the peripheral wall having an inlet port for an incoming stream of air carrying dirt and liquid, the inlet port communicating with the exterior of the housing and directing the incoming stream substantially tangentially to the peripheral wall so that liquid carried by the incoming stream is deposited on the peripheral wall, accumulates on the substantially horizontal bottom wall in the cyclone, and circulates as a body of dirt-laden liquid while coming repeatedly into contact with the incoming stream, excess dirt-laden liquid escaping through the outlet to the receptacle, wherein the housing includes a base portion containing the receptacle and a removable lid portion containing the cyclone, and wherein the lid portion includes a horizontal partition which supports the cyclone.

13. A suction cleaner comprising a housing whose interior is at reduced pressure in operation, an upwardly open liquid receptacle in the housing, and a cyclone above the receptacle in the housing, the cyclone having a curvilinear peripheral wall, a top wall extending inwards from the entire periphery of the peripheral wall, and a bottom wall extending substantially horizontally inwards from the entire periphery of the peripheral wall and having an outlet spaced from the peripheral wall and communicating with the receptacle, and the peripheral wall having an inlet port for an incoming stream of air carrying dirt and liquid, the inlet port communicating with the exterior of the housing and directing the incoming stream substantially tangentially to the peripheral wall so that liquid carried by the incoming stream is deposited on the peripheral wall, accumulates on the substantially horizontal bottom wall in the cyclone, and circulates as a body of dirt-laden liquid while coming repeatedly into contact with the incoming stream, excess dirt-laden liquid escaping through the outlet to the receptacle, wherein the housing includes a removable lid portion containing the cyclone, and wherein the lid portion includes a horizontal partition which supports the cyclone.

14. A suction cleaner as claimed in claim 13, wherein the curvilinear peripheral wall has a curvature which increases in the downstream direction.

15. A suction cleaner as claimed in claim 14, wherein the curvilinear wall extends over more than 360°.

16. A suction cleaner as claimed in claim 13, wherein an upper air outlet is provided in the top wall.

17. A suction cleaner as claimed in claim 13, wherein the inlet port is provided with a non-return inlet valve or flap valve.

18. A suction cleaner as claimed in claim 17, wherein the housing comprises a base portion containing the receptacle.

19. A suction cleaner as claimed in claim 13, further comprising a reservoir for a cleaning liquid, and wherein the reservoir has a smaller volume than the receptacle.

\* \* \* \* \*